(12) United States Patent
Daicos

(10) Patent No.: US 8,393,749 B1
(45) Date of Patent: Mar. 12, 2013

(54) FOLDABLE MIRROR AND ASSOCIATED METHOD

(76) Inventor: Andrea Daicos, Yuma, AZ (US)

(*) Notice: Subject to any disclaimer, the term of this patent is extended or adjusted under 35 U.S.C. 154(b) by 161 days.

(21) Appl. No.: 13/080,462

(22) Filed: Apr. 5, 2011

Related U.S. Application Data

(60) Provisional application No. 61/320,834, filed on Apr. 5, 2010.

(51) Int. Cl.
*F21V 33/00* (2006.01)

(52) U.S. Cl. ........ 362/142; 359/855; 359/862; 359/865; 248/466; 248/472; 248/474; 248/476

(58) Field of Classification Search ................. 362/142, 362/143, 144, 382; 359/855, 857, 861, 862, 359/865; 248/46, 472, 474, 475.1, 47, 479, 248/480
See application file for complete search history.

(56) References Cited

U.S. PATENT DOCUMENTS

| | | | |
|---|---|---|---|
| 915,913 A | 3/1909 | Warren | |
| 3,104,830 A | 9/1963 | Rock | |
| 4,268,121 A * | 5/1981 | Peskin | 359/856 |
| 4,290,659 A | 9/1981 | Yoshiyuki | |
| 4,460,246 A | 7/1984 | Peel | |
| 5,357,377 A * | 10/1994 | Payne et al. | 359/855 |
| 5,430,578 A * | 7/1995 | Reagan | 359/855 |
| 5,438,457 A * | 8/1995 | Moore | 359/855 |
| 5,777,808 A | 7/1998 | Rashad | |
| 5,997,147 A * | 12/1999 | Tatoian | 359/856 |
| 6,217,178 B1 * | 4/2001 | Drumheller et al. | 359/849 |
| 6,293,681 B1 * | 9/2001 | Frank | 359/871 |
| D552,851 S * | 10/2007 | Abrahamian | D6/301 |

OTHER PUBLICATIONS

U.S. Appl. No. 10/504,980, filed Feb. 20, 2003.
U.S. Appl. No. 11/161,283, filed Jul. 28, 2005, Tamara C. Dolton.

* cited by examiner

*Primary Examiner* — Ali Alavi

(57) ABSTRACT

A free-standing and adjustable tri-fold mirror preferably includes a tri-fold mirror having first, second and third reflective surfaces, a mounting bracket statically attached to a rear side of the tri-fold mirror, a swivel device pivotally mated to the mounting bracket, a stand attached to the swivel device and extending away from the tri-fold mirror, and a base member attached to a bottom end of the stand. Advantageously, the tri-fold mirror is freely pivotal along an x-axis and a y-axis while the stand remains stationary and further while the tri-fold mirror is freely adjusted between folded and unfolded positions respectively.

19 Claims, 4 Drawing Sheets

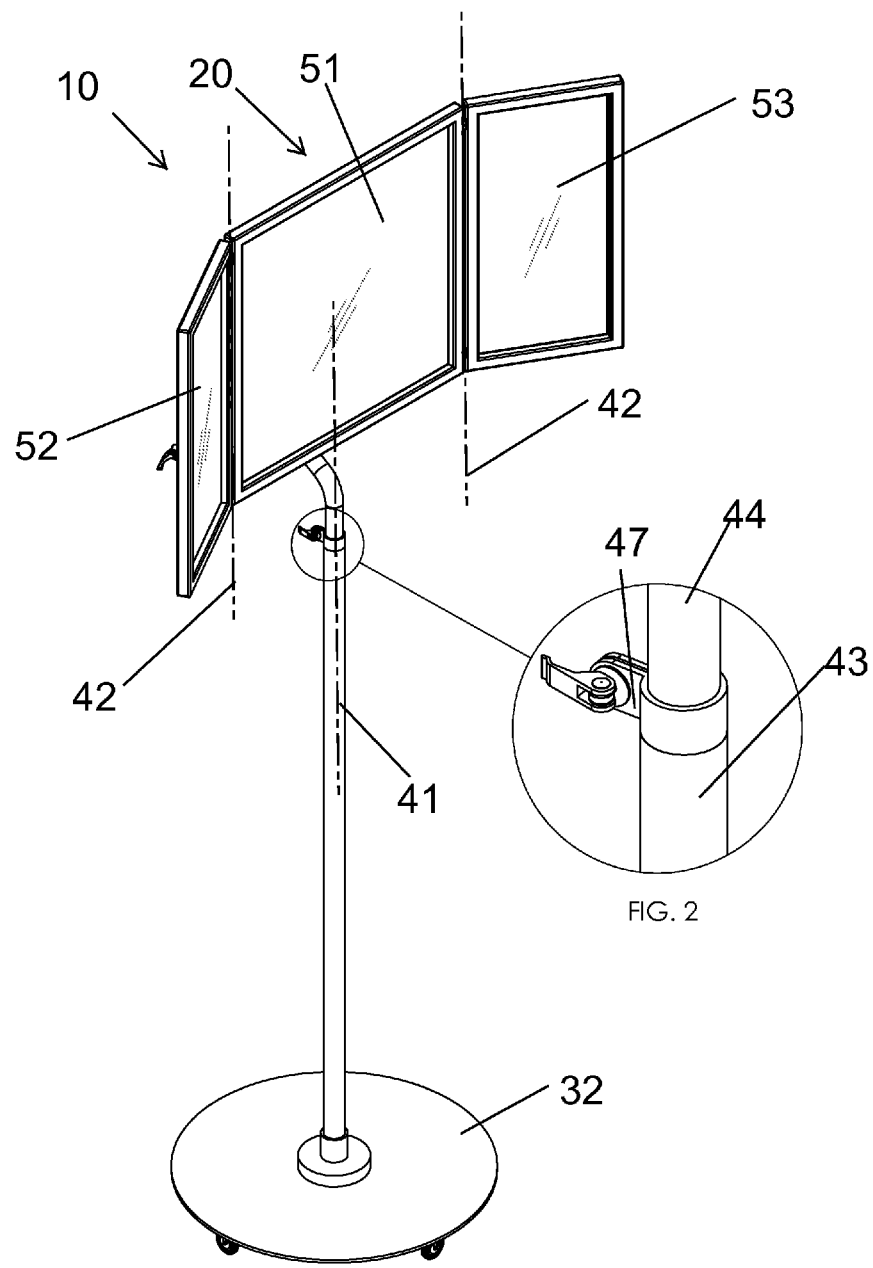

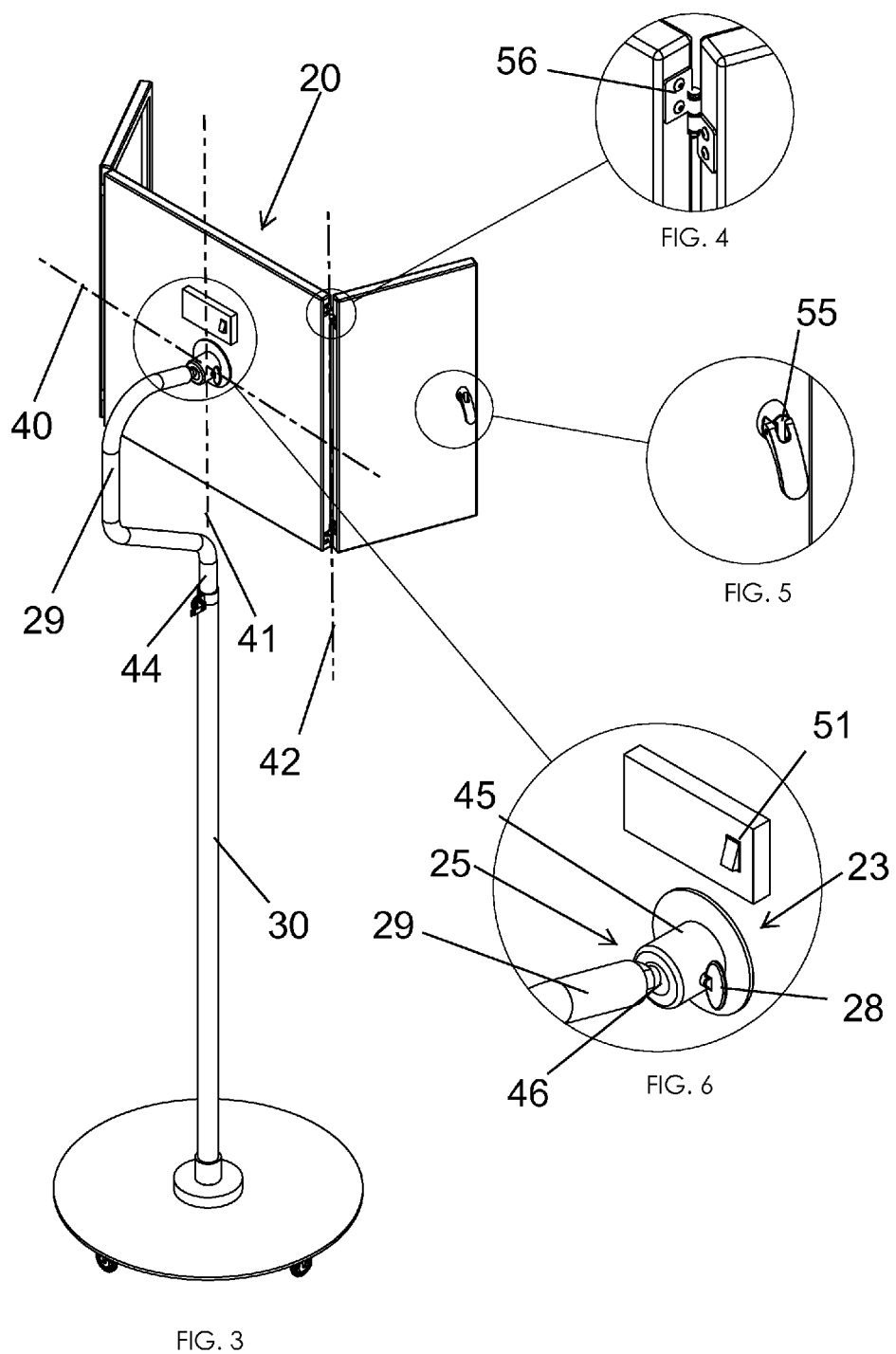

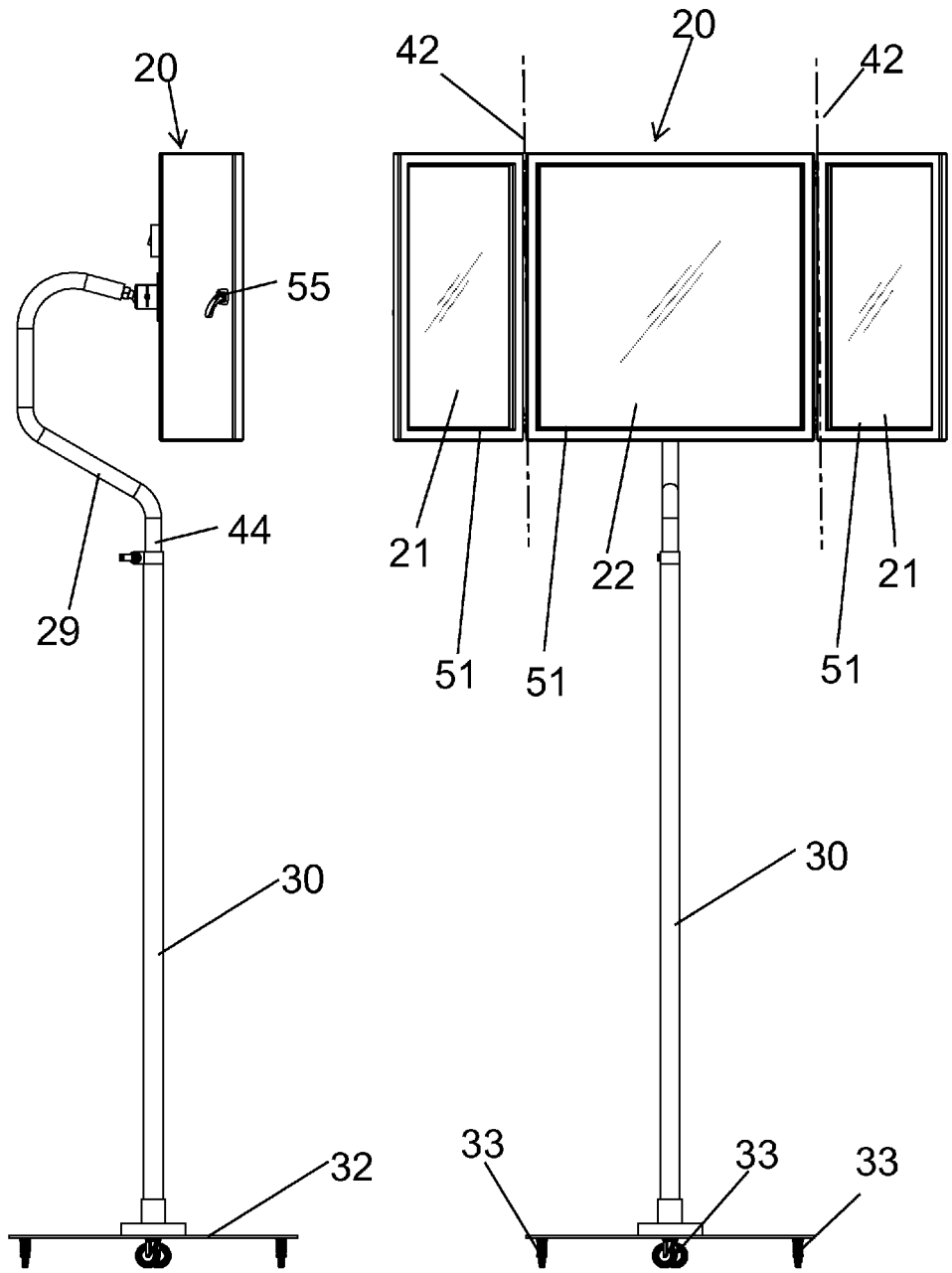

FOLDABLE MIRROR AND ASSOCIATED METHOD

CROSS REFERENCE TO RELATED APPLICATIONS

This application claims the benefit of U.S. Provisional Application No. 61/320,834, filed Apr. 5, 2010, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to mirrors and, more particularly, to a foldable mirror for providing users with an easy and convenient means of displaying the back and sides of customers' heads and backs while still being able to free user's hands for working.

2. Prior Art

For many Americans a trip to the barber or hair salon, tattoo parlor, oral surgeon, plastic surgeon, makeup artist or photographer is part of their monthly routine. The experience is pleasant enough with the stylist or barber making small talk and conversing with the client while cutting or styling their hair or applying makeup for example. When finished, the stylist will use a hand mirror to reflect the back of the client's head so the client can inspect and approve the new look or workmanship. Often times this process can be difficult as the client must instruct the stylist or even plastic surgeon to move the mirror at certain angles so as to get a glimpse of their entire head.

This process can also be tedious for the person who must decipher the client's instructions which may be reversed because of the angle at which the client is looking. For example, tattoo parlors still use a hand mirror to bounce off a stationary mirror, making it awkward to view sides, back and necks. The hospital is so hard to get up and down, but people always want to see them self. Imagine the wheelchair bound and people who are unable to move up and down to the bathroom mirror. The oral and plastic surgeons still use the hand mirror although vanity is all the rage, and people invest thousands of dollars to have cosmetic surgery. The hand mirror is therefore archaic and requires the user to hold thus making it difficult to make the necessary maneuvers to rectify a certain corrective action desired by the client.

Accordingly, a need remains for an apparatus in order to overcome the above-noted shortcomings. The present invention satisfies such a need by providing a foldable mirror that is convenient and easy to use, lightweight yet durable in design, versatile in its applications, and designed for displaying the back and sides of customers' heads and backs to customers while still being able to free user's hands for working.

BRIEF SUMMARY OF THE INVENTION

In view of the foregoing background, it is therefore an object of the present invention to provide a free-standing and adjustable tri-fold mirror for use during grooming procedures. These and other objects, features, and advantages of the invention are provided by a free-standing mirror preferably including a tri-fold mirror having first, second and third reflective surfaces; a mounting bracket statically attached to a rear side of the tri-fold mirror; a swivel device pivotally mated to the mounting bracket; a stand attached to the swivel device and extending away from the tri-fold mirror; and a base member attached to a bottom end of the stand. Advantageously, the tri-fold mirror is freely pivotal along an x-axis and a y-axis while the stand remains stationary and further while the tri-fold mirror is freely adjusted between folded and unfolded positions respectively.

In a non-limiting exemplary embodiment, the mounting bracket may include a socket statically affixed to the tri-fold mirror, and a locking knob rotatably attached to the socket and partially penetrated therethrough.

In a non-limiting exemplary embodiment, the swivel device may include a ball pivotally positioned within the socket and selectively engaged with the locking knob such that the ball is selectively locked at alternate pivot positions relative to an equilibrium position defined at an intersection of an x-axis and a y-axis located behind the tri-fold mirror.

In a non-limiting exemplary embodiment, the x-axis may be equidistantly spaced from top and bottom edges of the tri-fold mirror, and the y-axis may be vertically aligned with a longitudinal length of the stand.

In a non-limiting exemplary embodiment, the swivel device may further include a curvilinear end member protruding outwardly and away from the ball and mated to a top portion of the stand.

In a non-limiting exemplary embodiment, the stand may include a male section may have a top end attached to the curvilinear end member, a female section slidably and linearly receiving the male section therein, and a fastener wrapped about a top end of the female section. In this manner, the fastener is selectively adjusted between tensioned and released positions such that the male section is fixedly mated with the female section when the fastener is adjusted to the tensioned position.

In a non-limiting exemplary embodiment, the tri-fold mirror preferably includes a light source, and a user interface attached to the light source capable of selectively illuminating a front side of the tri-fold mirror.

In a non-limiting exemplary embodiment, the tri-fold mirror preferably includes first and second side mirrors and a center mirror intermediately located between the first and second side mirrors.

In a non-limiting exemplary embodiment, each of the first and second side mirrors may be hingedly mated to opposing linear edges of the center mirror respectively such that the first and second side mirrors are independently articulated along unique fulcrum axes defined along the opposing linear edges respectively.

In a non-limiting exemplary embodiment, the base member preferably includes a plurality of casters connected to a bottom surface thereof such that a bottom end of the stand remains elevated about a ground level.

The present disclosure may further include a method of utilizing a free-standing mirror for use during hair grooming procedures. Such a method preferably includes the chronological steps of: providing a tri-fold mirror having first, second and third reflective surfaces; providing and statically attaching a mounting bracket to a rear side of the tri-fold mirror; providing and pivotally mating a swivel device to the mounting bracket; providing and attaching a stand to the swivel device; extending the stand away from the tri-fold mirror; providing and attaching a base member to a bottom end of the stand; and freely pivoting the tri-fold mirror along an x-axis and a y-axis while maintaining the stand stationary and further while freely adjusting the tri-fold mirror between folded and unfolded positions respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a front perspective view showing a free-standing tri-fold mirror, in accordance with the present invention;

FIG. 2 is an enlarged partial view of a fastener used to lock the telescoping stand at a desired height;

FIG. 3 is a rear perspective view showing the location of the swiveling device and interrelationship between the side and center mirrors;

FIG. 4 is an enlarged partial view of a hinged connection between the side and center mirrors;

FIG. 5 is an enlarged partial view of the handle attached to a rear side of one side mirror;

FIG. 6 is an enlarged view of the swiveling device and light user interface;

FIG. 7 is a side elevational view of FIG. 1;

FIG. 8 is a front elevational view of FIG. 1; and

Figure 9:
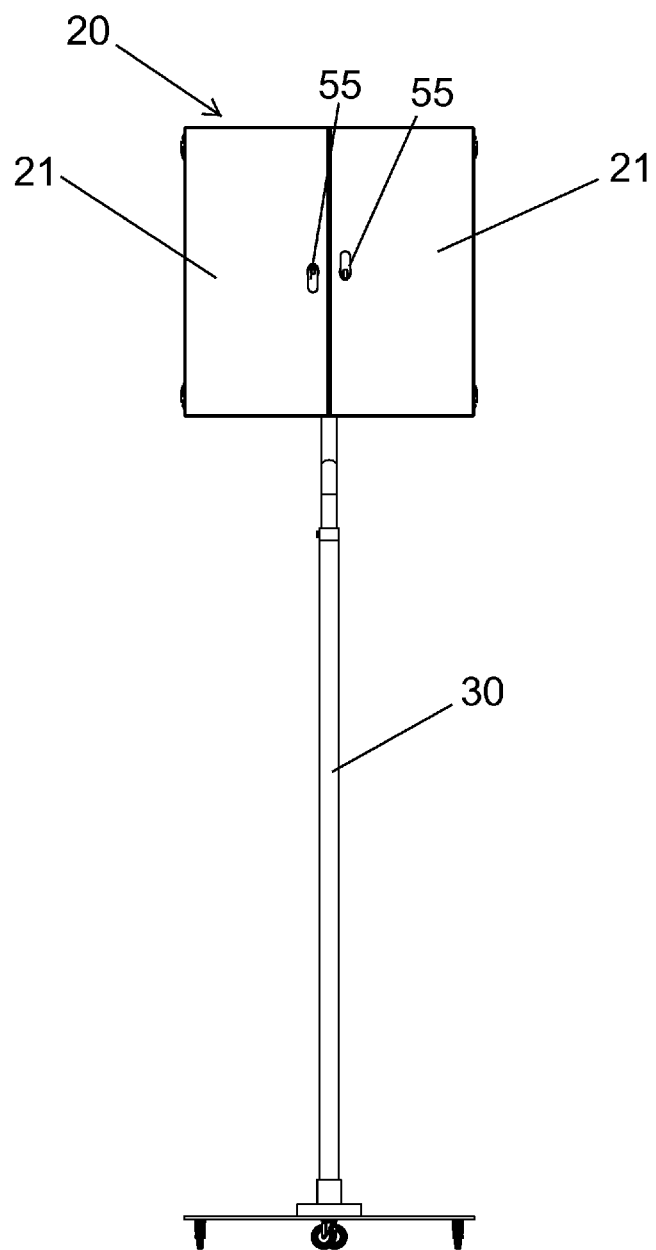
FIG. 9 is a front elevational view showing the tri-fold mirror at a closed postion.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The apparatus of this invention is referred to in FIGS. 1-9 and is intended to provide a free-standing adjustable mirror 10 for use during grooming procedures. It should be understood that the present invention may be used to display the back and sides of users' heads and backs and may be used during hair grooming and other facial grooming procedures.

Referring initially to FIGS. 1-9, a free-standing and adjustable tri-fold mirror 10 preferably includes a tri-fold mirror 20 having first 51, second 52 and third 53 reflective surfaces; a mounting bracket 23 statically attached to a rear side of the tri-fold mirror 20; a swivel device 25 pivotally mated to the mounting bracket 23; a stand 30 attached to the swivel device 25 that extends away from the tri-fold mirror 20; and a base member 32 attached to a bottom end of the stand 30. Advantageously, the tri-fold mirror 20 is freely pivotal along an x-axis 40 and a y-axis 41, via the swivel device 25, while the stand 30 remains stationary and further while the tri-fold mirror 20 is freely adjusted between folded and unfolded positions respectively. Such a structural configuration provides the unexpected and unpredictable advantage of permitting selectively articulation of the entire tri-fold mirror 20 as well as individual mirror sections 21, 22.

In a non-limiting exemplary embodiment, the mounting bracket 23 may include a socket 45 statically affixed to the tri-fold mirror 20, and a locking knob 28 rotatably attached to the socket 45 and partially penetrated therethrough.

In a non-limiting exemplary embodiment, the swivel device 25 may include a ball 46 pivotally positioned within the socket 45 and selectively engaged with the locking knob 28 such that the ball 46 is selectively locked at alternate pivot positions relative to an equilibrium position defined at an intersection of x-axis 40 and y-axis 41 located behind the tri-fold mirror 20 (perhaps best shown in FIG. 3).

In a non-limiting exemplary embodiment, the x-axis 40 may be equidistantly spaced from top and bottom edges of the tri-fold mirror 20, and the y-axis 41 may be vertically aligned with a longitudinal length of the stand 30.

In a non-limiting exemplary embodiment, the swivel device 25 may further include a curvilinear end member 29 protruding outwardly and away from the ball 46 and mated to a top portion of the stand 30.

In a non-limiting exemplary embodiment, the stand 30 may include a male section 44 having a top end attached to the curvilinear end member 29, a female section 43 slidably and linearly receiving the male section 44 therein, and a fastener 47 wrapped about a top end of the female section 43. In this manner, the fastener 47 is selectively adjusted between tensioned and released positions such that the male section 44 is fixedly mated with the female section 43 when the fastener 47 is adjusted to the tensioned position.

In a non-limiting exemplary embodiment, the tri-fold mirror 20 preferably includes a light source 50, and a user interface 51 attached to the light source capable of selectively illuminating a front side of the tri-fold mirror 20.

In a non-limiting exemplary embodiment, the tri-fold mirror 20 preferably includes first and second side mirrors 21 and a center mirror 22 intermediately located between the first and second side mirrors 21.

In a non-limiting exemplary embodiment, each of the first and second side mirrors 21 may be hingedly mated to opposing linear edges of the center mirror 22 via hinges 56, respectively, such that the first and second side mirrors 21 are independently articulated along unique fulcrum axes 42 defined along the opposing linear edges respectively. A handle 55 may be attached to a backside of at least one of the side mirrors 21.

In a non-limiting exemplary embodiment, the base member 32 preferably includes a plurality of casters 33 connected to a bottom surface thereof such that a bottom end of the stand 30 remains elevated about a ground level.

The present disclosure may further include a method of utilizing a free-standing mirror for use during hair grooming procedures. Such a method preferably includes the chronological steps of: providing a tri-fold mirror 20 having first 51, second 52 and third 53 reflective surfaces; providing and statically attaching a mounting bracket 23 to a rear side of the tri-fold mirror 20; providing and pivotally mating a swivel device 25 to the mounting bracket 23; providing and attaching a stand 30 to the swivel device 25; extending the stand 30 away from the tri-fold mirror 20; providing and attaching a base member 32 to a bottom end of the stand 30; and freely pivoting the tri-fold mirror 20 along an x-axis 40 and a y-axis 41 while maintaining the stand 30 stationary and further while freely adjusting the tri-fold mirror 20 between folded and unfolded positions respectively.

In a non-limiting exemplary embodiment, the mounting bracket 23 may be slidably mated to a swivel device 25 to enable a secure tight fit when a desired angle is reached. The tri-fold mirror 20 may further be slidably adjusted along a slidable bracket 27 situated at a top portion of the swivel device 25. The swivel device 25 may include a pivot ball joint to pivotally swivel up to 180 degree angles about the x-axis 40 and y-axis 41 and be locked when in a desired position. The telescoping stand 30 may be adjustably positioned to a plurality of heights.

The foldable mirror 10 may provide a number of benefits and advantages over existing prior art. For example, the apparatus 10 may be mobile, and easy to use. The foldable mirrors 21, 22 may be maneuvered to any angle desired allowing the user to have a 360 degree view of a target zone such as a user's head. The telescoping stand 30 which is sturdy and adjustable to any desired height may further allow the user complete freedom to travel anywhere the apparatus 10 is needed. As such, the apparatus 10 may be used in salons, barber shops, tattoo parlors and hospitals. Oral surgeons, plastic surgeons, gynecologist, mid-wives may further use it for their work. Makeup artist, designers, photographers may advantageously use the apparatus 10 for lighting applications as well.

In use, the foldable mirror 10 would be simple and straightforward to use. First, the user may position the apparatus 10 at the back of the work chair where a customer or patient may be seated. The tri-fold mirror 20 may next be adjusted up or down or turned to a desired angle to provide the user with a view of the back and sides of their head, shoulders or back. After use, the apparatus 10 may easily be pushed to a corner of the room ready to be moved to another customer or patient chair when needed.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention. In particular, with respect to the above description, it is to be realized that the optimum dimensional relationships for the parts of the present invention may include variations in size, materials, shape, form, function and manner of operation.

What is claimed as new and what is desired to secure by Letters Patent of the United States is:

1. A free-standing mirror for use during hair grooming procedures, said free-standing mirror comprising:
   a tri-fold mirror;
   a mounting bracket statically attached to a rear side of said tri-fold mirror;
   a swivel device pivotally mated to said mounting bracket;
   a stand attached to said swivel device and extending away from said tri-fold mirror; and
   a base member attached to a bottom end of said stand;
   wherein said tri-fold mirror is freely pivotal along an x-axis and a y-axis while said stand remains stationary and further while said tri-fold mirror is freely adjusted between folded and unfolded positions respectively.

2. The free-standing mirror of claim 1, wherein said mounting bracket comprises:

a socket statically affixed to said tri-fold mirror; and
a locking knob rotatably attached to said socket and partially penetrated therethrough.

3. The free-standing mirror of claim 2, wherein said swivel device comprises:
   a ball pivotally positioned within said socket and selectively engaged with said locking knob such that said ball is selectively locked at alternate pivot positions relative to an equilibrium position defined at an intersection of an x-axis and a y-axis located behind said tri-fold mirror.

4. The free-standing mirror of claim 3, wherein said x-axis is equidistantly spaced from top and bottom edges of said tri-fold mirror, wherein said y-axis is vertically aligned with a longitudinal length of said stand.

5. The free-standing mirror of claim 3, wherein said swivel device further comprises:
   a curvilinear end member protruding outwardly and away from said ball and mated to a top portion of said stand.

6. The free-standing mirror of claim 5, wherein said stand comprises:
   a male section having a top end attached to said curvilinear end member;
   a female section slidably and linearly receiving said male section therein; and
   a fastener wrapped about a top end of said female section;
   wherein said fastener is selectively adjusted between tensioned and released positions such that said male section is fixedly mated with said female section when said fastener is adjusted to said tensioned position.

7. The free-standing mirror of claim 1, wherein said tri-fold mirror comprises:
   a light source; and
   a user interface attached to said light source capable of selectively illuminating a front side of said tri-fold mirror.

8. The free-standing mirror of claim 1, wherein said tri-fold mirror comprises:
   first and second side mirrors and a center mirror intermediately located between said first and second side mirrors;
   wherein each of said first and second side mirrors is hingedly mated to opposing linear edges of said center mirror respectively such that said first and second side mirrors are independently articulated along unique fulcrum axes defined along said opposing linear edges respectively.

9. The free-standing mirror of claim 1, wherein said base member comprises: a plurality of casters connected to a bottom surface thereof such that a bottom end of said stand remains elevated about a ground level.

10. A free-standing mirror for use during hair grooming procedures, said free-standing mirror comprising:
    a tri-fold mirror having first, second and third reflective surfaces;
    a mounting bracket statically attached to a rear side of said tri-fold mirror;
    a swivel device pivotally mated to said mounting bracket;
    a stand attached to said swivel device and extending away from said tri-fold mirror; and
    a base member attached to a bottom end of said stand;
    wherein said tri-fold mirror is freely pivotal along an x-axis and a y-axis while said stand remains stationary and further while said tri-fold mirror is freely adjusted between folded and unfolded positions respectively.

11. The free-standing mirror of claim 10, wherein said mounting bracket comprises:
    a socket statically affixed to said tri-fold mirror; and
    a locking knob rotatably attached to said socket and partially penetrated therethrough.

12. The free-standing mirror of claim 11, wherein said swivel device comprises:
    a ball pivotally positioned within said socket and selectively engaged with said locking knob such that said ball is selectively locked at alternate pivot positions relative to an equilibrium position defined at an intersection of an x-axis and a y-axis located behind said tri-fold mirror.

13. The free-standing mirror of claim 12, wherein said x-axis is equidistantly spaced from top and bottom edges of said tri-fold mirror, wherein said y-axis is vertically aligned with a longitudinal length of said stand.

14. The free-standing mirror of claim 12, wherein said swivel device further comprises:
    a curvilinear end member protruding outwardly and away from said ball and mated to a top portion of said stand.

15. The free-standing mirror of claim 14, wherein said stand comprises:
    a male section having a top end attached to said curvilinear end member;
    a female section slidably and linearly receiving said male section therein; and
    a fastener wrapped about a top end of said female section;
    wherein said fastener is selectively adjusted between tensioned and released positions such that said male section is fixedly mated with said female section when said fastener is adjusted to said tensioned position.

16. The free-standing mirror of claim 10, wherein said tri-fold mirror comprises:
    a light source; and
    a user interface attached to said light source capable of selectively illuminating a front side of said tri-fold mirror.

17. The free-standing mirror of claim 10, wherein said tri-fold mirror comprises:
    first and second side mirrors and a center mirror intermediately located between said first and second side mirrors;
    wherein each of said first and second side mirrors is hingedly mated to opposing linear edges of said center mirror respectively such that said first and second side mirrors are independently articulated along unique fulcrum axes defined along said opposing linear edges respectively.

18. The free-standing mirror of claim 10, wherein said base member comprises: a plurality of casters connected to a bottom surface thereof such that a bottom end of said stand remains elevated about a ground level.

19. A method of utilizing a free-standing mirror for use during hair grooming procedures, said method comprising the chronological steps of:
    providing a tri-fold mirror having first, second and third reflective surfaces;
    providing and statically attaching a mounting bracket to a rear side of said tri-fold mirror;
    providing and pivotally mating a swivel device to said mounting bracket;
    providing and attaching a stand to said swivel device;
    extending said stand away from said tri-fold mirror;
    providing and attaching a base member to a bottom end of said stand; and
    freely pivoting said tri-fold mirror along an x-axis and a y-axis while maintaining said stand stationary and further while freely adjusting said tri-fold mirror between folded and unfolded positions respectively.

* * * * *